Aug. 13, 1935.  C. F. PFLUEGER  2,011,075
ARTIFICIAL FISHING BAIT OR LURE
Filed Nov. 2, 1932

INVENTOR
CHARLES T. PFLUEGER
BY Ely & Barrow
ATTORNEYS

Patented Aug. 13, 1935

2,011,075

UNITED STATES PATENT OFFICE 2,011,075

ARTIFICIAL FISHING BAIT OR LURE

Charles T. Pflueger, Akron, Ohio, assignor to The Enterprise Manufacturing Company, Akron, Ohio, a corporation of Ohio Application November 2, 1932, Serial No. 640,814

8 Claims. (Cl. 43—46)

This invention relates to artificial fishing baits or lures and particularly to hook mountings therefor.

One purpose of the present invention is to provide an improved fastener for securing hooks to bait bodies which will permit the hook to swivel and to swing but will prevent its being cocked in any fixed position to spoil the action of the bait.

A further purpose is to provide a fastener so constructed that when the fish is struggling with the bait the hook will adjust itself to any angular position required in such a way as to prevent fish from obtaining a leverage on, and damaging, the fastener.

A further purpose of the invention is to provide fasteners for hooks which while permitting the above-described hook actions will prevent entangling of tail and body or belly hooks on the bait.

In the mounting of hooks on fishing lures, as heretofore constructed, so that the hook will swivel on the bait body, the bait body is countersunk and a metal eyelet inserted. This is not an entirely satisfactory construction since the bait body so countersunk is weakened especially at the tail portion thereof and is likely to crack or split in service. A further purpose of the invention is to provide a hook fastener for fishing lures in which such countersinking is avoided.

The foregoing and other purposes or objects of the invention are attained in the baits or lures illustrated in the accompanying drawing and described below, it being understood that the invention is not limited to the specific form thereof shown and described.

Of the accompanying drawing.

Figure 1:
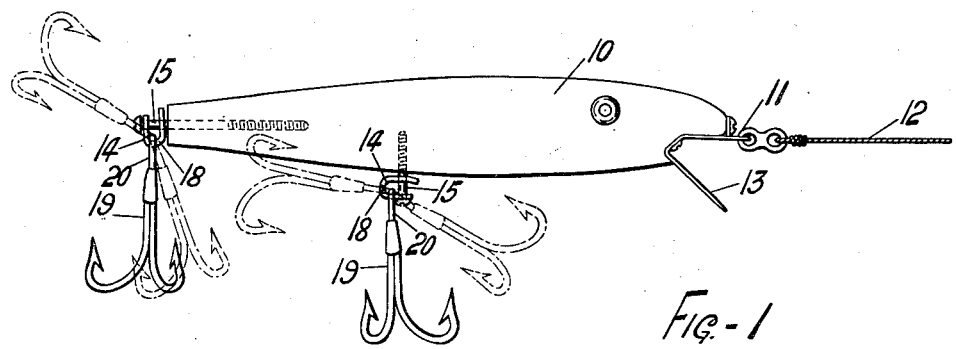
Figure 1 is an elevation of an artificial bait embodying the invention.
Figure 2:
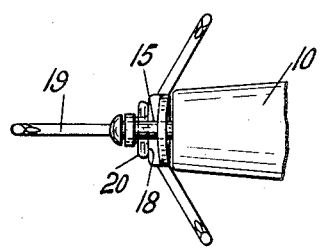
Figure 2 is an enlarged top plan view of the tail end of said bait.
Figure 3:
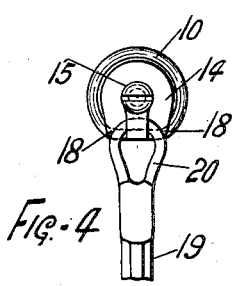
Figure 3 is an enlarged side elevation of the tail end of the bait.
Figure 3:
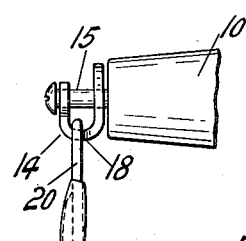
Figure 5:
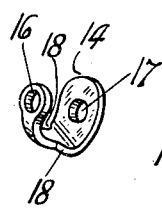
Figure 5 is a perspective view of the hook suspending loop.
Figure 4:
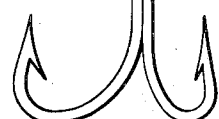
Figure 4 is an end elevation of the tail end of the bait.

Referring to the drawing, the numeral 10 designates a bait body which may be of any suitable material such as wood shaped and decorated to provide a lure and having suitable means at its forward end, indicated at 11, for attaching a leader 12 and suitable means such as a diving plane 13 whereby the bait will have a movement through the water attractive to a fish.

The bait 10 is shown with tail and belly hooks secured thereto by means of carriers 14, 14 swiveled on screws 15, 15 threaded into the bait body with projecting outer ends. These carriers may take a number of forms, that shown herein being of looped or clevis form. Rings or plates may be substituted for the loops and obtain the swivelling mounting of the hook. Loops are believed to be preferable as they allow a wide range of movement for the hooks. In certain types of baits suitable means other than screws may be provided for pivots for the carriers 14. The loops 14 shown have aligned apertures 16 and 17 in the sides thereof through which the screws or other pivots extend, these apertures being of such size compared to the screws or pivots as to freely swivel the loops on their pivots. The inner sides of the loops may be broader than the outer sides thereof and thus provide shoulders at 18, 18 limiting inward swinging of the hooks and the heads of the screws or pivots may be enlarged so as to limit outward swinging of the hooks. The hooks are indicated at 19, 19 and have the usual eyes 20 which are engaged in the loops as shown.

As will be apparent, the hooks may freely swivel with the loops 14 through a complete circle about the screws or pivots 15 and likewise may swing on the loops 14 to any angle between the dotted line extreme positions thereof shown, i. e. the hook may swing anywhere in a substantially hemispherical space outwardly from the bait body about the pivot. The hook cannot become cocked in a fixed position to destroy the action of the bait, nor is it possible for the fish to get a leverage on the fastener to damage the same. However, because of shoulders 18, the tail hook may not swing inwardly under the bait and become entangled with the belly hook. The screws 15 may be threaded into a wooden bait body without splitting or cracking the bait body and countersinking of apertures in the bait body likely to cause such splitting or cracking is avoided.

Modifications of the invention may be resorted to without departing from the spirit thereof or the scope of the appended claims.

What is claimed is:

1. An artificial bait comprising a body portion, a screw threaded into the body portion with its outer end projecting therefrom, a loop freely swiveled on the screw, and a hook having an eye engaged in said loop whereby the hook may swing freely on the loop, said loop having sides provided with apertures through which the screw extends, the loop having shoulders adjacent the bottom of the loop for limiting swinging of a hook on the loop in one direction, the screw head limiting its swinging in the opposite direction.

2. An artificial bait comprising a body portion having a pivot projecting therefrom, a closed carrier freely swiveled for movement completely about the axis of the pivot, and a hook having an eye engaged with the carrier whereby the hook may swing freely about the pivot and on the carrier.

3. An artificial bait comprising a body portion having means providing a pivot fixedly mounted thereon, a loop freely swiveled on the pivot by engagement of the pivot through apertures in the sides of the loop, a hook having an eye engaged with the loop whereby the hook may swing freely on the loop, and means for limiting swinging of the hook on the loop inwardly thereof.

4. The combination with a bait body of a hook and means for supporting the hook on the bait body, said means comprising a loop freely swiveled at its respective ends on the bait body, said hook being mounted to swing on the loop between limited angular positions whereby the hook may freely swing to any position in a substantially hemispherical space outwardly of the bait body about the pivot of said loop.

5. The combination with a bait body of a pivot projecting rigidly from the body, a closed carrier freely swiveled on and movable in a complete circle about the pivot and a hook mounted to swing freely on the carrier between limited angular positions outwardly of the bait body.

6. The combination with a bait body of a clevis freely swiveled thereon so as to be movable in a determinate orbit outwardly of the bait body, and a hook mounted on the clevis freely to swing between limited angular positions.

7. The combination with a bait body of a closed carrier freely swiveled thereon so as to be movable in an orbit about a fixed axis, outwardly of the bait body and a hook mounted on the carrier to swing thereon.

8. The combination with a bait body of a closed loop freely swiveled on the tail of the bait body on an axis having a fixed position with relation to the body, and a hook mounted to swing freely on the loop between limited angular positions outwardly of the bait body.

CHARLES T. PFLUEGER.